United States Patent
Anderson et al.

(10) Patent No.: US 8,793,731 B2
(45) Date of Patent: Jul. 29, 2014

(54) ENHANCED CONTENT SEARCH (75) Inventors: David Anderson, Florence, NJ (US); Shemimon Manalikudy Anthru, Dayton, NJ (US); Jens Cahnbley, Princeton Junction, NJ (US); David Anthony Campana, Princeton, NJ (US); Ishan Mandrekar, Monmouth Junction, NJ (US)

(73) Assignee: Thomson Licensing, Issy les moulineaux (FR)

(*) Notice: Subject to any disclaimer, the term of this patent is extended or adjusted under 35 U.S.C. 154(b) by 0 days.

(21) Appl. No.: 13/576,789

(22) PCT Filed: Dec. 8, 2010

(86) PCT No.: PCT/US2010/003109
§ 371 (c)(1),
(2), (4) Date: Aug. 2, 2012

(87) PCT Pub. No.: WO2011/102824
PCT Pub. Date: Aug. 25, 2011

(65) Prior Publication Data
US 2012/0304231 A1 Nov. 29, 2012

Related U.S. Application Data

(60) Provisional application No. 61/306,170, filed on Feb. 19, 2010.

(51) Int. Cl.
*G06F 13/00* (2006.01)
*G06F 3/00* (2006.01)
*H04N 5/445* (2011.01)

(52) U.S. Cl.
USPC ............... 725/40; 725/39; 725/43; 725/50; 725/51; 725/53

(58) Field of Classification Search
USPC ............... 725/39–40, 43, 50–51, 53
See application file for complete search history.

(56) References Cited

U.S. PATENT DOCUMENTS

| | | | |
|---|---|---|---|
| 2002/0162120 A1* | 10/2002 | Mitchell | 725/135 |
| 2007/0250848 A1 | 10/2007 | Gorti et al. | |
| 2008/0271085 A1 | 10/2008 | Wang | |
| 2009/0113469 A1* | 4/2009 | Jo et al. | 725/32 |
| 2009/0138441 A1* | 5/2009 | Valentine et al. | 707/3 |

FOREIGN PATENT DOCUMENTS

| | | |
|---|---|---|
| KR | 2008 079029 | 8/2008 |
| KR | 935303 | 1/2010 |
| WO | WO 2007/054687 | 5/2007 |

* cited by examiner

*Primary Examiner* — Mulugeta Mengesha
(74) *Attorney, Agent, or Firm* — Robert D. Shedd; Jerome G. Schaefer (57) ABSTRACT

A method and system including a controller with an internet interface of providing enhanced content is provided. The controller receives an electronic program guide data and retrieves at least one characteristic identifying a program currently being displayed on a primary display device within the electronic program guide. At least one external content source is searched using the internet interface for information related to the program based on the at least one characteristic and the information related to the program obtained during the search is stored into a memory. The information stored in the memory and related to the first program is displayed by a user interface display processor on a second display.

16 Claims, 7 Drawing Sheets

ENHANCED CONTENT SEARCH

CROSS-REFERENCE TO RELATED APPLICATIONS

This application claims the benefit, under 35 U.S.C. §365 of International Application PCT/US2010/003109, filed Dec. 8, 2010 which was published in accordance with PCT Article 21(2) on Aug. 25, 2011 in English and which claims the benefit of U.S. provisional patent application No. 61/306,170 filed Feb. 19, 2010

FIELD

The present arrangement provides a system and method that automatically searches and retrieves information from at least one source that is associated with content selected by a user.

BACKGROUND

Consumers have access to vast libraries of content which may be accessed and viewed on an electronic display device. This content includes data stored in their personal collection of digital media as well as content available on the Internet either at no cost or via a subscription based fee structure. However, a drawback associated with accessing the vast amount of content available is that it can be a tedious task for a consumer/user to sort through and locate content of interest to them.

Currently, a user may perform a manual search for any information associated with content being viewed. Typically, a user must actively and manually execute a web browser application on, for example, a personal computer, access a search engine and input a query for information on content that is currently being accessed. This manual search may, for example, locate a Wikipedia article about the currently accessed content. The user is then able to click through links in the article to find additional content related to the currently accessed content in which they have an interest. After locating this additional content, the user must then manually perform a search of content providers (i.e. Hulu.com, YOUTUBE, etc) in an attempt to locate and access the additional related content. This has a variety of disadvantages such as being a time consuming, tedious process to locate related content. Additionally, consumers/users may simply not be aware of the existence of all of the content providers to which they have access. Therefore, there is a need to simplify the process of connecting consumers to content of interest and for which they have access rights.

SUMMARY

In one embodiment, a method provides enhanced content. The method is performed by a controller with an internet interface. The controller receives electronic program guide data and retrieves at least one characteristic identifying a program within the electronic program guide. At least one external content source is searched using the internet interface for information related to the program based on the at least one characteristic and the information related to the program obtained during the search is stored into a memory. The information stored in the memory and related to the first program is displayed by a user interface display processor on a second display.

In another embodiment, a first display is tuned to a first program within the electronic program guide. Access to information stored in the memory and related to the first program is provided to a user. The information stored in the memory and related to the first program may be displayed on a second display.

In a further embodiment, a system provides enhanced content. The system includes a receiver that receives electronic program guide data and an internet interface that enables communication between the system and at least one external content source. A related content processor retrieves at least one characteristic identifying a first program of a plurality of programs within the electronic program guide and searches the at least one external content source for information related to the first program based on the at least one characteristic. A memory stores information related to the first program obtained from the at least one external content source. A user interface display processor displays the information stored in the memory and related to the first program on a second display.

In yet another embodiment, the system includes a tuner that tunes one program of the plurality of programs for display on a first display device and a communication processor provides access to the information stored in the memory to a user on a second display.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

BRIEF DESCRIPTION OF THE DRAWINGS

FIG. 3B is another augmented Wikipedia example in accordance with an aspect of an embodiment;

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

There exists a plethora of digital media content stored on various sources at various locations which are selectively accessible by users using a communication network. Navigating through and isolating content that is desirable to a user is a daunting task because of the mass amounts of data available to the user. The present system advantageously enables access to and delivery of primary content to a user. The system also advantageously automatically acquires a set of enhanced content that is related (hereinafter, "enhanced related content") to the primary content being accessed by the system. Primary content may include any audio, video or audiovisual data stored or broadcasted that is accessible by the system for delivery to a user. The primary content may include, but is not limited to, (a) a broadcast television program, (b) a television program that is delivered via an on-demand subscription, (c) a television program that is stored on a storage medium that is selectively accessible by the system, (d) a terrestrial or satellite radio broadcast, (e) an audio program delivered via an on-demand service (f) audio program stored on a storage medium that is selectively accessible by the system (i.e. a network storage device) and (g) a sporting event. Enhanced content includes at least one type of data that is related to the selected primary content currently being accessed by the system. The system automatically searches for and acquires data to be included as part of the set of enhanced related content by using characteristic data associated with the primary content to identify a relationship between the primary content and other content of user accessible content of interest that may be acquired and provided as enhanced related content.

In one embodiment, the system queries sources that include information related to accessible content which is produced for mass consumption. The sites queried are hereinafter referred to as content information sources. For example, the system may initiate a search of The Internet Movie Database found at http://www.IMDB.com which is a site that provides detailed information on movies, television, video games and other forms of audiovisual entertainment. Alternatively, the system may initiate a search of Wikipedia.org which provides detailed, user-edited articles on a wide variety of topics such as media content as well as information identifying persons who contributed to production of the media production and in identifying media related to the article topic (such as individual episodes of a TV series or tracks on a music album). These sources of content information are described for purposes of example only and any source of content information may be queried by the system. The querying of content information sources enables the system to acquire related content information which describes the primary content being accessed by the system. The acquired related content information may be included as an element of the set of enhanced related content that may be presented to a user.

Upon performing a search of content information sources, the system uses the acquired related content information to automatically search content provider sources for content related to the primary content. Content providers commonly offer links to locations where the related content may be accessed by at least one of the user and the system. Heretofore, these links have been manually created on the content provider end based on the opinions and observations of employees who are tasked with identifying related content. Alternatively, recommendation algorithms may be used for identifying related content. These algorithms may work by identifying content that users have shown interest in (such as by purchasing or rating) and finding other users with similar interests. Such links, whether manually or algorithmically determined may be used as input by the system in order to locate these links and add content corresponding to these links to a list of related content that may be presented to the user in a display image as an Interesting Content List. The system advantageously dynamically locates content enabling a greater breadth of search. The system provides a user centric search that balances user interest in terms of content availability versus an entire library of content provider specific data, and specifies a full chain of content discovery from initial identification of interesting content to links to user accessible content.

Figure 1:
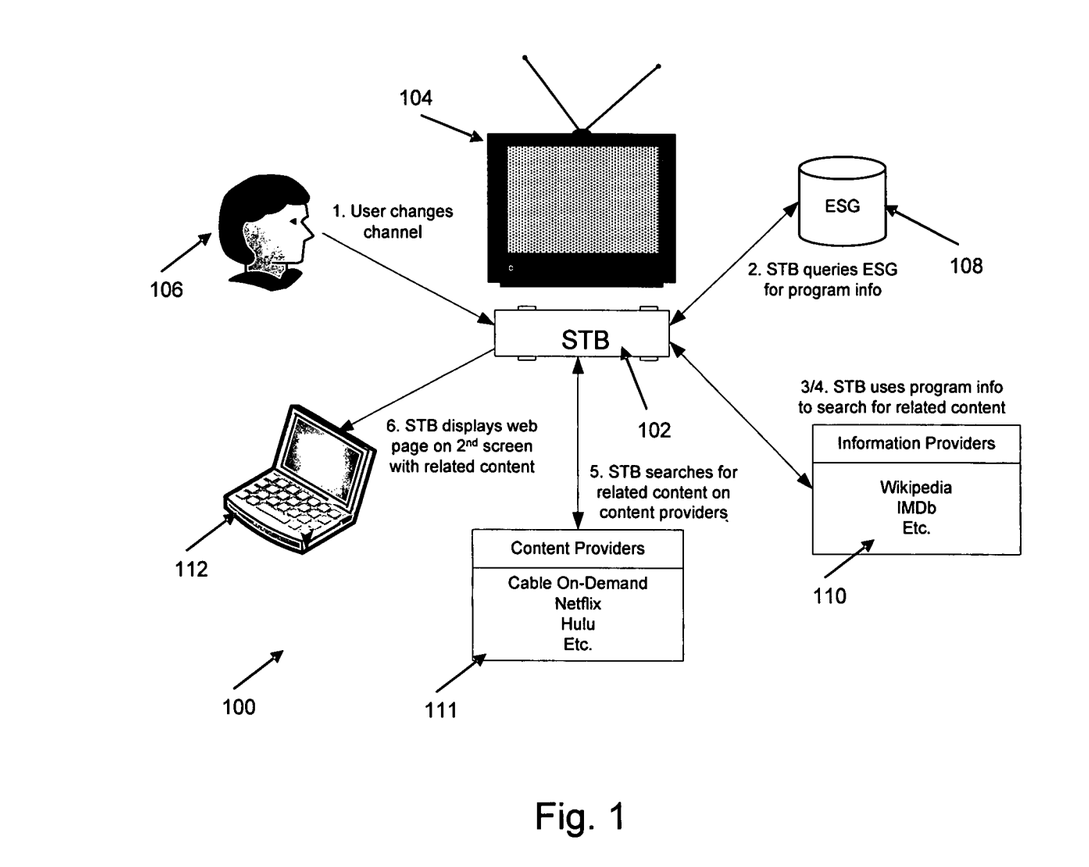
FIG. 1 is an overview in accordance with an aspect of an embodiment.

One exemplary embodiment of the system 100 is shown in FIG. 1 which includes a set top box 102, for example a cable television set top box, including a tuner module that selectively tunes an input signal from a cable/satellite provider. The set top box 102 is coupled to a primary display device 104, for example a high definition television monitor, which selectively displays content corresponding to the signal tuned by the tuner module in the set top box 102. While a set top box 102 is described as the access point enabling selection and viewing of content, it should be noted that any device including at least one tuner module enabling selection of content as primary content may be used to implement the present system. Alternatively, the system may be implemented by any device that allows any piece of content to be selected and provided to a user in any manner. The system advantageously utilizes the currently selected content as the basis for automatically searching for and acquiring a set of enhanced content related to the currently selected content. A secondary display device 112 may be provided for display of the enhanced content. The secondary display device 112 may be any computing device that has access to at least one of a local area network and wide area network and which can access and receive data representing the enhanced content from the set top box 102 for display thereon. Secondary display device 112 includes but is not limited to, a computer, a laptop, a netbook, a tablet computer, a cellular phone, a smart phone or a second monitor different from the primary display device 104.

The set top box 102 is controlled by a user or other device (e.g. a VCR, a DVR, another tuner, etc) in a known manner, for example using a remote control (not shown), to cause the set top box 102 (or primary display device 104) to tune a particular piece of content that may be displayed on primary display device 104. The content selected by the user includes ancillary data such as program guide data and other information that describe the content currently selected by the set top box 102. Program guide data and any other data identifying and/or describing the currently tuned content are parsable by the system for use when searching content information sources on a network for enhanced content related to the currently selected content. Program guide data may include electronic program guide (EPG) and/or electronic service guide (ESG) may be acquired and/or provided from a source of program guide data 108. One skilled in the art appreciates that EPG and ESG data are synonymous with one another and may be used interchangeably. As shown in FIG. 1, the source 108 includes ESG data but the source 108 may also include EPG data. As an example, characteristic data describing the currently selected content that may be displayed as part of the electronic program guide include (a) program title, (b) actors appearing in program, (c) data of original airing, (d) episode title data, (e) series data, (f) plot synopsis data and (g) data describing topics/situations shown in the currently viewed content. The data describing the currently viewed content is described for purposes of example only and any type of data as determined by the content provider may be incorporated and used by the system.

Figure 3A:
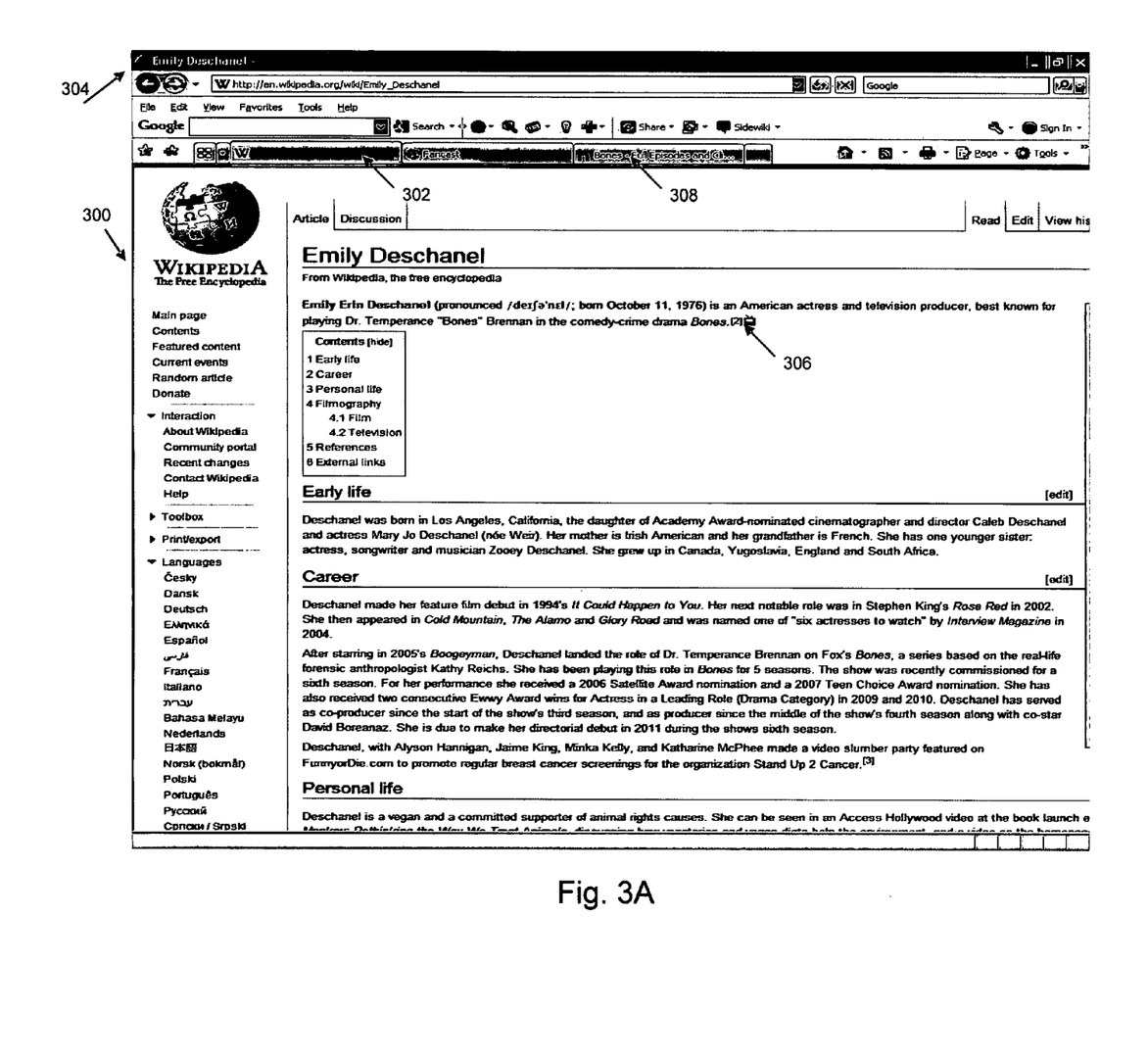
FIG. 3Aa is an augmented Wikipedia example in accordance with an aspect of an embodiment.

Thus, the tuner of the set top box 102 functions as the relevant content selection identifier which identifies description data from data describing the currently viewed program for use as input for a related content search module that searches a set of information providers 110 that include information about the currently viewed program. The related content search module further searches a set of content providers 111 for content that corresponds to the information about the currently viewed program. The set top box 102 further includes a user interface (UI) display module (as shown in FIG. 3) for selectively displaying the results from the related content search module on the secondary display device 112. The following is an exemplary description of how an enhanced set of content related to the primary content is caused to be displayed on the secondary display device 112. The following includes a description of television shows and types of enhanced content associated with the television show. However, one skilled in the art would appreciate that the system is operable to tune any television show, either broadcast live or stored on a storage medium, and acquire a set of enhanced content associated therewith for display on the secondary display device 112.

In this exemplary embodiment, a user 106 may change generate a control signal requesting a channel change. The set top box 102 queries the electronic service guide from the electronic service guide source 108 to derive description information associated with the tuned program. The description information is used by a related content search module executing on the set top box 102 to search information providers 110 for content that is related to the tuned program. In response to acquiring related information, the related information is used as an input for searching a set of content providers 111 to acquire content that is associated with the information about the tuned program. Once related content is acquired, the set top box 102 causes the data representing the related content to be displayed on a secondary display device 112, for example, as a web page enabling the user to selectively access the related content.

Figure 2:
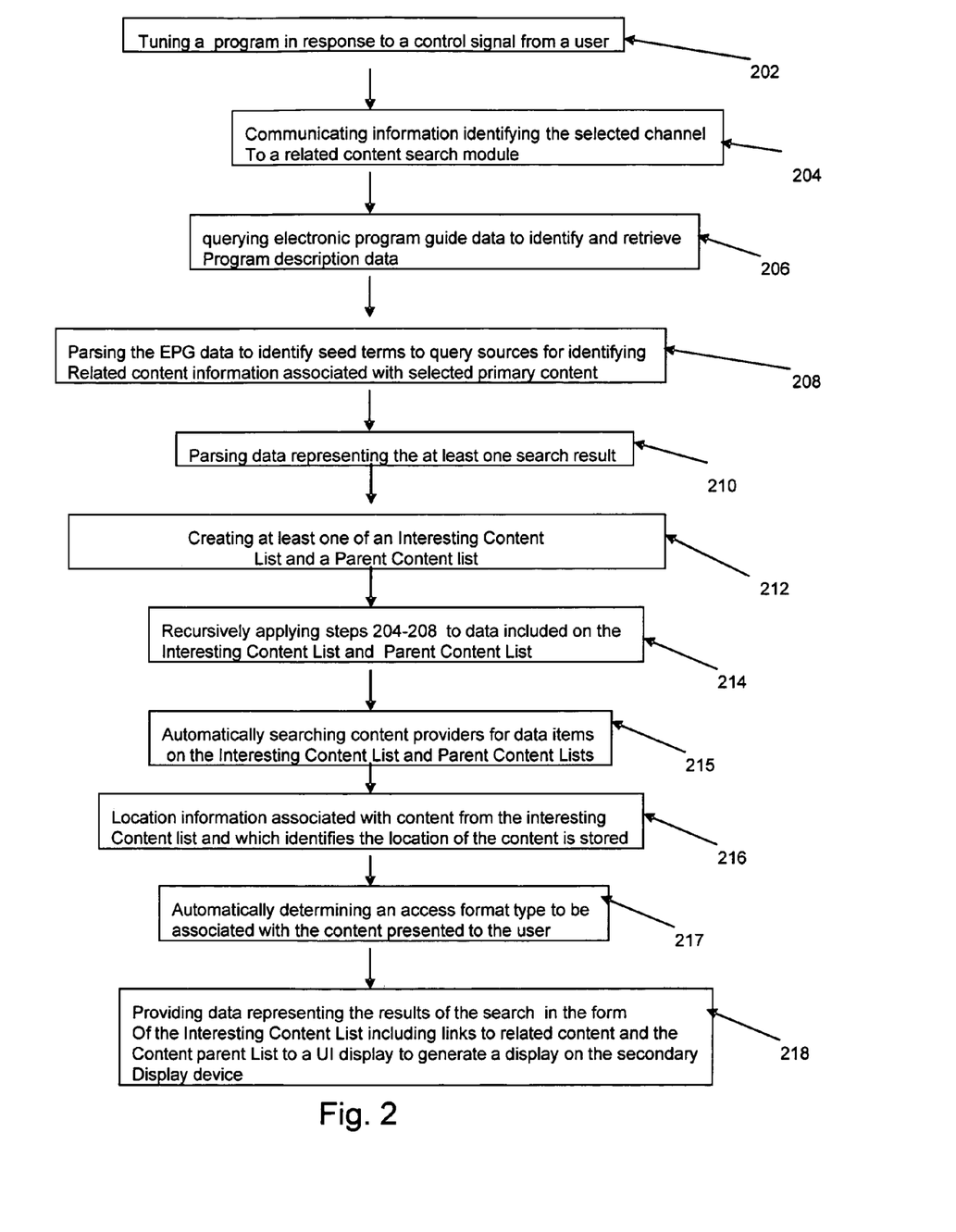
FIG. 2 is a flow diagram detailing an exemplary operation of an embodiment.

FIG. 2 is a flow diagram detailing an exemplary operation of the system described in FIG. 1 using the references numerals set forth therein. This embodiment describes a system whereby the primary content selected is a television program tuned by the set top box 102 and the primary display device is a television 104. In step 202, a user 106 causes a control signal to be transmitted via a remote control to set top box 102 for selecting a piece of primary content on a particular channel, for example, the TV series Bones on channel TNT. In step 204, the tuner module of the set-top box 102 communicates information identifying the selected channel to the related content search module. In step 206, the related content search module queries electronic program guide (EPG) data to retrieve program description data such as series and episode titles. The EPG data can be stored within the system hosting the related content search module (such as the set-top box) or externally, such as by a cable provider web service. While this embodiment utilizes EPG data, the principles of system operation may be applied to ESG data as well.

The related content search module, in step 208, parses the EPG data 108 to identify seed terms to query sources for identifying related content information associated with the primary content, e.g. the television series Bones. A seed term is any description data describing primary content selected by the system. For example, the search of the EPG data reveals that the title of the series is "BONES" and this title data may be used by the related content search module to connect to the Internet and search a set of information providers 110. Examples of information providers include but are not limited to Wikipedia, IMDB or any other source including information about audiovisual program data. In the present example, the related content search module automatically searches Wikipedia for the show's root article. The related content search module may utilize a proprietary search mechanism and algorithm or may use a third party search web service such as provided by Google or any other internet search provider. Upon locating the article corresponding to the television program Bones, this content is identified as enhanced related content and the resulting article is returned in a particular data format, (e.g. HTML/XHTML or Wikitext markup language) to be rendered for display to an end user. An exemplary operation of the related content search module for use in searching for content related to the television program Bones is as follows:

Accessing the Google search page to enter and query resulting in, for example, the following search result.
  a. accessing Google search page
  b. enter Search query: site:wikipedia.org Bones TV series
  c. Search result: http://en.wikipedia.org/wiki/Bones_(TV_series)

It should be noted that the above hyperlink and any subsequent hyperlinks are used for purposes of example only. These hyperlinks may or may not be active and may or may not contain data. Any data stored at the location corresponding to any hyperlink is not required for an understanding of the present invention. The related content search module then parses the data representing the search result in step 210. In this example, the data representing the search result is a Wikipedia article which is parsed for references to potentially interesting and related content. Such analysis may occur using natural text parsing techniques or by exploiting standard Wikipedia formatting and by applying such analysis to links within the Wikipedia content. The results of this parsing by the content search module are categorized and organized to create at least one of an Interesting Content List and a Content Parent List in step 212. An Interesting Content List includes a plurality of user selectable image elements (e.g. links, icons, etc) to content that has been identified as being related to the primary selected content in response to the analysis performed in step 208 and which can be selectively accessed for at least one of viewing and listening by a user. The Content Parent List includes a plurality of user selectable image elements (e.g. links, icons, etc) for accessing information related to the primary selected content derived from the analysis in response to the analysis performed in step 208. However, data in the Content Parent List does not link to user accessible content. Rather, the data in the Content Parent List enables a user to perform the search and analysis described in steps 206-210 for the selected related information.

The following is a non-exhaustive listing of some examples of the analysis performed in step 210 that the related content search module applies to a Wikipedia search associated with the primary content selected by the user.

In one embodiment, the Wikitext source is parsed and the textual string "{{Infobox television}}" is located. This is standard Wikipedia formatting for content that appears on pages describing television programs. Similar Infobox identifiers exist for "actor", "film", etc. allowing the related content search module to identify the nature of the article's topic. Articles are thus added to the Interesting Content List or Content Parent List.

In another embodiment, the Wikitext source is parsed to find the episode list. Standard Wikipedia formatting offers a "list_episodes" attribute within the Infobox to identify the list of episodes (http://en.wikipedia.org/wiki/List_of_Bones_episodes). This list of episodes provides information such as season #, episode #, and episode title and the episodes found are added to the Interesting Content List.

Names of interest (actor, director, writer, etc.) are obtained via EPG data or via parsing Wikipedia or the combination of both. For example, the female lead in Bones is actress Emily Deschanel, and as such Emily Deschanel can be identified as a name of interest and the Wikipedia article retrieved on Emily Deschanel can be automatically added to the Content Parent List.

Upon creating the Content Parent List and Interesting Content List in step 212, the related content search module can automatically recursively apply the steps described in steps 206-210 to the data in each respective list as discussed in step 214. For example, the Wikipedia Article about Emily Deschanel can be parsed to locate interesting content related to her. This searching algorithm may be automatically repeated on each piece of enhanced related content to develop and create a detailed set of enhanced content that may be selectively stored locally or on a remote storage device accessible via a network that can be automatically presented to the user in response to the primary content selected by the user. Alternatively, the recursive application of the search algorithm may be applied in response to a user selecting a link from within the set of enhanced related content presented to the user on the primary display device 104 or the secondary display device 112.

Upon creation of the Interesting Content List, the related content search module automatically searches content providers 111 for items on the Interesting Content List as shown in step 215. The set of content providers may include at least one of (a) local user content (e.g., found on a home media server via UPnP on the local area network), (b) subscription services of the user (e.g., cable "On Demand" content, Netflix InstantWatch content, etc.), and (c) openly accessible Internet services (e.g., Hulu, Fancast, TV network sites, etc.).

In the example described above whereby the Bones episode list has been parsed and data representing Bones episodes is added to the Interesting Content List, the related content search module automatically locates a source that may provide the user with the episode that corresponds to the data in the list. For example, the related content search module can automatically query the website www.fancast.com to locate the page http://www.fancast.com/tv/Bones/94501/full-episodes in order to provide a source for episodes of Bones. Location information associated with content from the Interesting Content List is stored and identifies the location of that content in step 216. Location information may include any of (a) a universal resource locator (URL) pointing to an episode on Fancast, (b) a URL pointing to a set-top box provided web service that enables On Demand content to be played back with a click, (c) a URL pointing to the local network share path where the episode is stored and may be streamed, (d) any other identifier enabling a user to access the related content. As used herein, the term 'link' can be used to describe such information, regardless of if the content is web-based. The link including location information may be presented to the user on the secondary display via the set top box 112 as discussed below. The system advantageously aggregates all related content for display to the user regardless of whether or not the user can actually access the related content. The system automatically determines an access format type to be associated with the content presented to the user in step 217. An access format type associated with the link to the related content may point the user to the full content (for free or for pay), to a preview of the content (such as a trailer), to a purchasable format (such as Amazon streaming or DVD), or to some other format including at least partial access to the related content. Alternatively, the related content search module may automatically query a source of user rights information that includes a set of content providers to which the user has access. The source of rights information may be automatically populated based on subscription information associated with at least one user. Alternatively, the source of rights information may be selectively updated by the at least one user based on access rights to third party content providers. Upon querying and determining the level of access available to the at least one user, the system determines what type of access format will be associated with a respective piece of related content.

The related content search module provides data representing the results of the search in the form of the Interesting Content List with links to the related content and the Content Parent List to a UI display module executing on the set top box 102 in step 218. The UI display may be in the form of a web browser running on the second display device 112 that is pointed at a web server running on the set-top box 102.

Exemplary output from step 218 which identifies playable content (e.g. TV series episodes, films, etc.) which were added to the Interesting Content List is shown in FIGS. 3A and 3B. The system may present the Interesting Content List data to a user in a tab 302 (FIG. 3A) of a web browsing application 304 (FIG. 3A) executing on the secondary display device 112. The playable (or accessible) content on this list produced in steps 214-218 may be presented as links 306 (FIG. 3A) which are accessible by the user and result in acquiring and/or viewing content at least one of within the same tab (302) on the secondary display device 112 or in a new tab 308 (FIG. 3A) on the secondary display device 112. Alternatively, if the parsing performed by the related content search module identifies data that does not correspond to playable content but identifies information that can be used as part of the set of enhanced content, this non-playable data may be considered a "parent" node of interesting content is added to the Content Parent List. Examples of parent node data include but are not limited to TV series, actor, etc.

Examples of augmented content displayed by the user interface display are shown in FIGS. 3A and 3B. FIG. 3A shows an exemplary UI display 300 generated by a user interface display module including data representing related content information for the television show Bones. Display 300 is a web browsing application 304 executing on the secondary display device 112 which enables tabbed display of different web pages. The currently active tab 302 includes data representing a Wikipedia article on the actress Emily Deschenel who was identified by the system in response to parsing EPG data upon selecting the television show Bones as the primary content. In this example, the actress data (e.g. Emily Deschanel) is identified as the seed for the related content search described above. The related content search module has parsed this article and located the reference to the TV series "Bones" in which she stars. "Bones" is thus added to the Content Parent List for Emily Deschanel and the related content search is performed recursively for "Bones". The UI display module identifies that content for "Bones" is available from the Interesting Content List for "Bones" by placing a small user selectable icon 306 next to the reference to "Bones". The icon inserted by the system may be representative of the type of content to which access is provided. For example, as shown herein, the link is to the television show Bones and the system may augment the page with an icon of a television which, when selected, brings a user to the location where the content is stored and may be viewed or acquired (downloaded). Other exemplary content-type specific icons may be used to identify relations including, but not limited to (a) a TV for television related content; (b) a film strip for movie content; (c) an iconic person for individuals involved in content production and (d) a user specified icon representing a particular type of content. Upon selection of the icon 306, the system automatically locates the content using the location data stored on the system and opens at least one different tab 308 in which the content may be presented to the user for viewing.

FIG. 3B includes the same base display image 300 of the Emily Dechenel article displayed in in tab 302 of browsing application 304. However, the article has been augmented by the system in a different manner. While the page has been parsed and a content-specific type of icon 306 has been inserted adjacent to the content description on the page, the system has automatically generated an overlay page that generates a pop-up window 307 including information about the content when the user places a pointer image element over the content-type specific icon 306. In this embodiment, a small popup window 307 containing a link to the Fancast page for the series "Bones" where episodes can be transmitted to the user. The popup window 307 may include any link that is associated with the content to be provided such as accessible content from the Interesting Content List or to additional results from the Content Parent List. Upon selection of the link in pop up window 307, the system automatically locates the content using the location data stored on the system and opens at least one different tab 308 in which the content may be presented to the user for viewing.

While the above description of identifying and acquiring related content is described for a broadcast television program, one skilled in the art may apply the principles of the system to any type of content that is available to a user. In an alternate embodiment, the system may tune a music station enabling a user to listen to a radio program. In this embodiment, the system identifies the content by parsing radio program guide information and, in order to acquire related content, may search content information sources other than Wikipedia, Google, and Fancast as described above. The system would then search content provider sources that are specific to the type of primary content being accessed by the user, for example internet radio broadcast sites, the iTunes store, etc. The techniques also apply to scenarios beyond television such as music playback and the location of related music in the user's music library, on a subscription service such as Rhapsody, or on a purchase site such as Amazon MP3 and the like.

Figure 4:
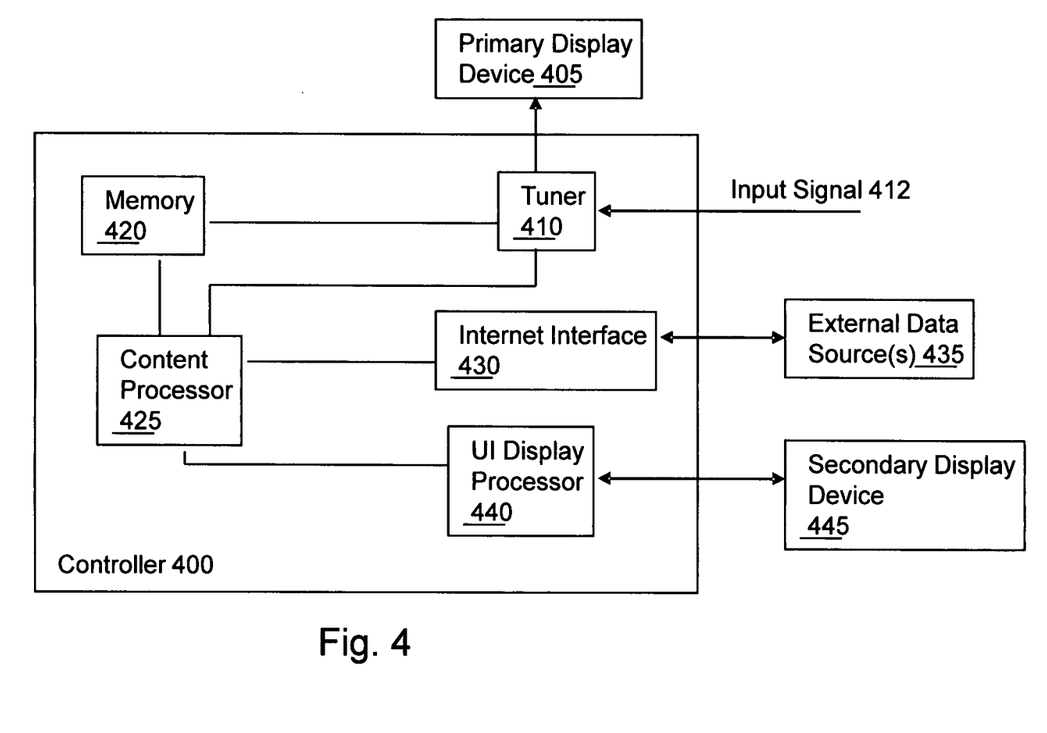
FIG. 4 is a block diagram of example components in accordance with an aspect of an embodiment.

FIG. 4 is a block diagram of an exemplary controller 400 that implements the system described above with respect to FIGS. 1 and 2. The controller 400 may be a hardware component embodied in a set top box 102 as shown in FIG. 1. The controller 400 includes a tuner 410 that selectively receives and tunes an input signal 412. The input signal may be a television broadcast signal formatted in a particular signal format such as those set forth by the Motion Pictures Experts Group (MPEG) or any other signal format used for encoding and transmitting audiovisual data and ancillary data associated with the audiovisual data. The tuner 410 tunes a desired program from the input signal 412 for display on a primary display device 405 in response to a control signal. Any ancillary data accompanying the tuned input signal 412 is decoded and stored in a memory 420. The ancillary data may include Electronic Program Guide (EPG) data or any other data encoded and transmitted with the input signal 412.

The controller 400 further includes a content processor 425 coupled to both the tuner 410 and the memory 420. The content processor 425 identifies the program and/or channel tuned by tuner 210 in order to assign the tuned content as the primary content. The content processor 425 queries the EPG or other associated data stored in the memory 420 to identify characteristics that describe the primary content which may be used to search additional sources for related content information and for sources where related content is stored. Data representing the characteristics describing the primary content may be used as search terms in a searching algorithm to locate information about the primary content. The content processor 425 initiates a search across at least one of a local and wide area network for information about the primary content. The content information search algorithm executed by the content processor 425 engages an internet interface 430 which is coupled thereto to initiate a search of external data sources 435. Data representing the results of the search are retrieved by the content processor 425 and may be stored in memory 420. Content processor 425 parses the retrieved related content information stored in memory 420 to generate at least one of an interesting content list including location data identifying a location where related content may be found and parent content list including data used by the system to search for additional related content recursively. The interesting content list data and parent content list data may also be stored in the memory for later access thereto.

Content processor 425 automatically initiates a related content search algorithm which parses the interesting content list stored in the memory to search at least one external data source 435 for a source file of the content corresponding to the data in the interesting content list. As used herein, external data source 435 is a generic term used to denote any source of data for any purpose. For example, external data source 435 may be a source of content information (i.e. Wikipedia or IMDB.com) or a content provider (i.e. Netflix, Fancast.com).

Upon performing the search for content, content processor 425 obtains the results including the location of the related content in the interesting content list and appends the interesting content list with the retrieved location data. Content processor 425 automatically generates user-selectable links for the item on the interesting content list that include the location data for the particular piece of content.

The system may automatically take into consideration user preferences and past user behavior data for use as input in order to search for related content. The system may automatically track user behavior including user navigation and content selection data that can be stored in memory 420. The system can further access the user preference and navigation data to identify other potential types of related content information and content sources that are displayed to the user on the secondary display device. Additionally, the system may use user preference and behavior data to identify other aspects of the related content information that may be highlighted when presented to the user on the secondary display device.

Content processor 425 provides data representing the interesting content list with the user selectable links to a user interface (UI) display processor 440. UI display processor 440 automatically formats the interesting content list according to a predetermined format and causes the interesting content list to be displayed on a secondary display device 445 which is separate and different from the primary display device. In one embodiment, the UI display processor may provide the formatted user interface to the internet interface 430 which functions as a webserver and allows a browser executing on the secondary device 445 to be pointed to a hosted user interface allowing user access thereto. Once presented on the secondary device 445, a user may browse and navigate the data items on the list in order to select related content that interests them. Upon locating interesting content, the user may select the associated link and the related content associated with the selected link may be automatically acquired and displayed to the user on the secondary device 445. For example, the interesting content list may include a link to a content source that provides a user access to other episodes of the television program selected as the primary content. A user can select this link and a display image associated with the content source may be displayed to the user on the secondary display allowing the user to select additional episodes of the primary content for viewing on the secondary device 445.

While the above description is associated with the interesting content list, one skilled in the art will recognize that the same principle may be associated with the parent content list which may be presented to the user on the secondary display 445 in the same manner as the interesting content list. However, the parent content list provides user selectable links that, upon selection by a user, initiate a further search for related content to be performed by the system. For example, parent content information may include information about the actors in the currently viewed content. If a user selects a link associated with one of the actors, the system automatically performs a search for related information and related content associated with the selected actor in addition to the related content associated with the primary content selected by the system. Thus, the system advantageously enables a user to rapidly locate and acquire as much information about the currently viewed content in order to improve and enhance the viewing experience.

In one embodiment, the system described in FIG. 4 automatically performs the content information search and content provider search for every program identified in the EPG data stored in memory 420 upon receipt of the EPG. The automatic search advantageously enables the system to populate a database with related content information at predetermined intervals when network/viewing activity is reduced. The system may then initiate and perform the above search algorithms on the data in the database when the user selects the primary content thereby reducing the amount of time required to provide the user with the set of enhanced related content.

In another embodiment, the system may be embodied in a server responsible for serving a set of users. In this embodiment, the server executes the search algorithms described above to populate the database and provides users access to the database to reduce the bandwidth and processing power needed to perform a full search of all of the possible content information and content provider sources. In response to selection of primary content, the set top box may automatically execute an application that initiates the content information and content provider search in the database of the server for related content thus reducing the amount of processing power, bandwidth and time required to provide the user with a set of enhanced content information.

Figure 5:
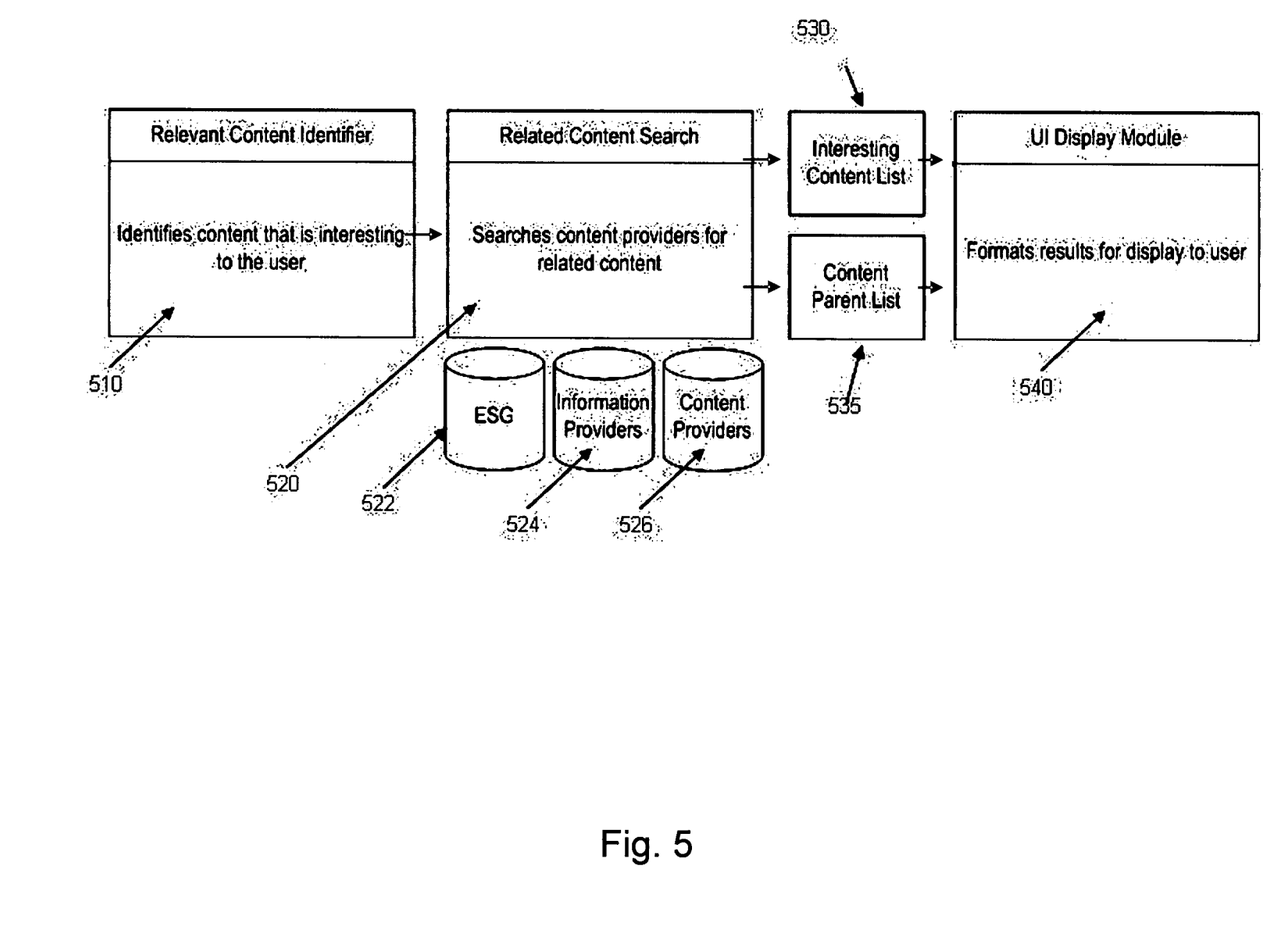
FIG. 5 is a block diagram of example components in accordance with an aspect of an embodiment.

FIG. 5 is an exemplary block diagram of components used to find interesting content associated with the currently selected primary content. A Relevant Content Identifier 510 automatically identifies a seed that is interesting to the user to be used for searching for related content. The automatic identification of the seed data may be performed by identifying the program and channel that is currently being viewed by the user. The related content search component 520 uses data sources 522, 524 and 526 to locate content that is related to the seed to produce Interesting Content List and Content Parent List. The data sources that are searchable by the related content search component 520 include data that typically originates with external sources to provide attributes/characteristics associated with content in order to establish relations between seed content and available related content. These data sources include, but are not limited to, 1. ESG (or, alternatively, EPG) data 522 which includes service (program) guide data that provides content title, subtitle, and possibly additional information such as contributors to the production of the content. For example, actors, director, etc. in the case of video content;
2. Information Provider Data 524 which includes extended information on content. For example, actors, directors, etc. for video content, episode listings for TV content, etc; and
3. Content Provider Data 526 that provides libraries of content that is potentially user accessible. For example, content provider data may include online streaming services, on-demand movie services, the user's local content collection, etc.

Upon performing the search of the data sources, the system automatically generates at least one of an Interesting Content List 530 and a Content Parent List 535. The lists 530 and 535 include data representing the output of the related content search component 520. The interesting content list 530 includes a list of content consisting of identifying title, link to access content, user access rights (ex., free vs. pay, mobile device transfers, etc.), content provider information, and possibly additional metadata that may be useful for the UI Display or future search seeding. The Content Parent List includes a list of potential related content 'parents'—i.e., seeds for future searches. For example, an actor that appears in video content would be identified as a content parent and as such placed in the Content Parent List.

The lists 530 and 535 are provided to the UI Display 540 which formats the UI for display thus allowing a user to interact with the data items on each of Interesting Content List and Content Parent List. Exemplary formats for presenting content in the lists 530 and 535 are provided in FIGS. 3A and 3B and described below. The UI display 540 may automatically augment an existing user interface that has been returned as part of the related content search. An exemplary augmented page may include HTML links embedded within a customized copy of the related content information (e.g., a Wikipedia article). For example, the Emily Deschanel article mentions numerous movies that she has been part of—"It Could Happen to You", "Rose Red", "Cold Mountain", etc. The UI display module automatically parses the Wikipedia article and inserts the content provider links where appropriate. This edited article is provided for display on the second display device. The UI display module can also identify items from the Content Parent List and intercept these links to recursively apply the related content search algorithm to generate an additional set of enhanced related content related to Emily Deschanel. In another embodiment, augmentation may include generating similar links as described above but, instead of modifying the actual page with content provider links, generates a page including links that overlay a Wikipedia article. In a further embodiment, the UI display 540 may format the UI as a dedicated related content browser which may appear as a separate application/web page or as a component embedded in a user interface. For example, the dedicated related content browser may include an HTML listing of related content and content parents with links. This HTML listing can be provided as its own web page or can be included in a program information web page that contains additional information (e.g., as a tab).

Figure 6:
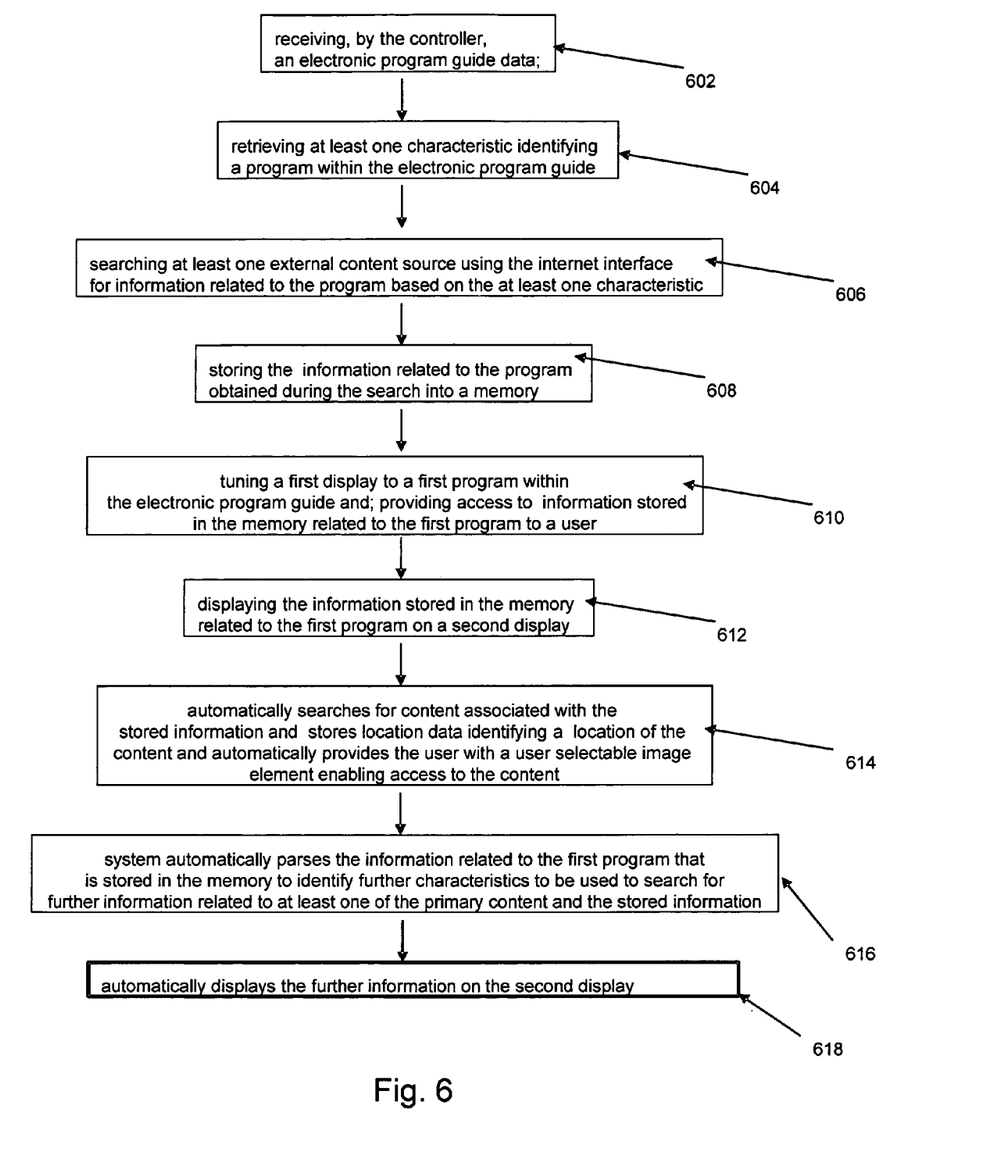
FIG. 6 is a flow diagram detailing the operation of an aspect of an embodiment.

FIG. 6 is a flow diagram detailing an algorithm controlling the operation of the enhanced content search system. The system provides enhanced content, via a controller with an interne interface. The controller receives electronic program guide data in step 602 and identifies at least one characteristic identifying a program within the electronic program guide in step 604. At least one external content source is searched using the internet interface for information related to the program based on the at least one characteristic in step 606. The information related to the program obtained during the search is stored into a memory in step 608. In one embodiment, steps 602-608 are automatically repeated for each program within the electronic program upon receipt of the guide by the system. In another embodiment, a first display is tuned to a first program within the electronic program guide and access to information stored in the memory that is related to the first program is provided to a user in step 610 and the information stored in the memory related to the first program is displayed on a second display in step 612. In a further embodiment, the system automatically searches for content associated with the stored information and stores location data identifying a location of the content and automatically provides the user with a user selectable image element enabling access to the content in step 614. In yet another embodiment, the system automatically parses the information related to the first program that is stored in the memory to identify further characteristics to be used to search for further information related to at least one of the primary content and the stored information in step 616 and automatically displays the further information on the second display in step 618.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of providing enhanced content, the method performed by a set top box including a controller with an internet interface, the method comprising:
   a. receiving, by the controller, electronic program guide data;
   b. identifying at least one characteristic identifying a program being displayed on a primary display device coupled to the set top box, the at least one characteristic being from within the electronic program guide;
   c. searching at least one external content source using the internet interface for information related to the program based on the at least one characteristic;
   d. storing the information related to the program obtained during the search into a memory within the set top box;
   e. organizing, by the controller, the information related to the program into a first list of data items enabling user access to content corresponding to the information related to the program and a second list of data items including data derived from the content, the second list of data items enabling initiation of a further search for further related information using the data derived from content; and f. displaying, via a user interface display processor, the first list of data items and second list of data items stored in the memory and related to the program on a separate device having a second display, the separate device having the second display having a browser pointed to a webserver of the internet interface for accessing additional information via links within the first list of data items and second list of data items displayed on the second display.

2. The method of claim 1 further comprising:
repeating steps b-d for each program within the electronic program.

3. The method of claim 1, further comprising:
tuning a first display to a first program within the electronic program guide and;
providing access to information stored in the memory related to the first program to a user.

4. The method of claim 1, further comprising
parsing the stored related information to identify content that is related to the primary content;
automatically searching a plurality of external data sources using the internet interface for content identified during said activity of parsing; and
retrieving related content for presentation to a user on a second display.

5. The method of claim 4, further comprising the activity of
identifying location information associated with content located in said activity of automatically searching; and
storing the location information associated with the content in the memory.

6. The method of claim 5, further comprising the activity of
displaying, via user interface processor, data representing the retrieved related content including the location information associated with the retrieved related content on the device having the second display enabling user access thereto.

7. The method of claim 4, further comprising the activity of
identifying an access format type for determining a level of access available for respective retrieved content;
associating the determined access format type with the respective retrieved content; and
storing data representing the associated access format type for the respective retrieved content in a memory.

8. The method of claim 7, further comprising the activity of
displaying, via user interface processor, data representing the retrieved related content including the associated access format type with the retrieved related content on the second display device enabling user access thereto.

9. A set top box for providing enhanced content, the set top box comprising:
a receiver that receives electronic program guide data;
an internet interface providing communication to at least one external content source;
a related content processor that retrieves at least one characteristic identifying a first program of a plurality of programs from within the electronic program guide, searches the at least one external content source for information related to the first program based on the at least one characteristic and organizes the information related to the first program into a first list of data items enabling user access to content corresponding to the information related to the first program and a second list of data items including data derived from the content, the second list of data items enabling initiation of a further search for further related information using the data derived from content, the first program being displayed on a primary display device;
a memory that stores information related to the first program obtained from the at least one external content source, and
a user interface display processor that initiates a display of the first list of data items and second list of data items stored in the memory and related to the first program on a secondary display device that is separate from the set top box, the secondary display device having a browser pointed to a webserver of the internet interface for accessing additional information via links within the first list of data items and second list of data items displayed on the second display.

10. The set top box of claim 9, wherein
the related content processor retrieves at least one characteristic identifying a program within the electronic program guide and searches at least one external content source for information related to the program based on the at least one characteristic for each of said plurality of programs within said electronic program guide.

11. The set top box of claim 9, further comprising:
a tuner that tunes one program of the plurality of programs for display on a first display device and;
said user interface display processor provides access to the information stored in the memory to a user on a second display.

12. The set top box of claim 9, wherein said related content processor
parses the stored related information to identify content that is related to the primary content;
automatically searches a plurality of external data sources using the internet interface for the identified content; and
retrieves related content via the internet interface for presentation to a user on a second display.

13. The set top box of claim 12, wherein said related content processor identifies location information associated with content located in the search of the plurality of external data sources and stores the location information associated with the content in the memory.

14. The set top box of claim 13, wherein said user interface processor displays data representing the retrieved related content including the location information associated with the retrieved related content on the second display device and enables user access thereto.

15. The set top box of claim 12, wherein said related content processor
identifies an access format type that determines a level of access available for respective retrieved content;
associates the determined access format type with the respective retrieved content; and
stores data representing the associated access format type for the respective retrieved content in a memory.

16. The set top box of claim 15, wherein said user interface processor displays data representing the retrieved related content including the location information associated with the retrieved related content on the second display device and enables user access thereto.

* * * * *